(12) United States Patent
Hammett et al.

(10) Patent No.: US 10,462,881 B1
(45) Date of Patent: Oct. 29, 2019

(54) QUICK SETUP OF LIGHTING CONTROL SYSTEM

(71) Applicant: Cooper Technologies Company, Houston, TX (US)

(72) Inventors: Geoffrey Granville Hammett, Norcross, GA (US); Michael Alan Lunn, Peachtree City, GA (US); William Lee Shiley, Senoia, GA (US); Jay Michael Sachetti, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 9 days.

(21) Appl. No.: 15/489,452

(22) Filed: Apr. 17, 2017

Related U.S. Application Data

(60) Provisional application No. 62/323,233, filed on Apr. 15, 2016.

(51) Int. Cl.
*H05B 37/02* (2006.01)
*G06F 3/02* (2006.01)
*G08B 5/38* (2006.01)

(52) U.S. Cl.
CPC .......... *H05B 37/0272* (2013.01); *G06F 3/02* (2013.01); *G08B 5/38* (2013.01); *H05B 37/0281* (2013.01)

(58) Field of Classification Search
CPC ... H05B 37/0272; H05B 37/0281; G06F 3/02; G08B 5/38
See application file for complete search history.

(56) References Cited

U.S. PATENT DOCUMENTS

| | | | |
|---|---|---|---|
| 2006/0044152 A1* | 3/2006 | Wang | H04L 12/2803 340/2.24 |
| 2012/0040606 A1* | 2/2012 | Verfuerth | H05B 37/0218 455/7 |
| 2013/0085620 A1* | 4/2013 | Lu | H04L 12/2807 700/286 |
| 2013/0223279 A1* | 8/2013 | Tinnakornsrisuphap | H04L 41/0809 370/254 |
| 2014/0176011 A1* | 6/2014 | Szabados | H05B 37/0254 315/297 |
| 2016/0360594 A1* | 12/2016 | Chemel | H05B 37/0227 |
| 2017/0006694 A1* | 1/2017 | Davis | H05B 37/0263 |

* cited by examiner

*Primary Examiner* — Douglas W Owens
*Assistant Examiner* — Pedro C Fernandez
(74) *Attorney, Agent, or Firm* — King & Spalding LLP

(57) ABSTRACT

A lighting system includes a gateway device having a user input interface. The lighting system further includes a first lighting device configured to wirelessly communicate with the gateway device, and a second lighting device configured to wirelessly communicate with the gateway device. The gateway device is configured to initiate wireless communications with the first lighting device and the second lighting device in response to an input provided to the gateway device via the user input interface.

20 Claims, 4 Drawing Sheets

QUICK SETUP OF LIGHTING CONTROL SYSTEM

CROSS REFERENCE TO RELATED APPLICATIONS

The present application claims priority under 35 U.S.C. Section 119(e) to U.S. Provisional Patent Application No. 62/323,233, filed Apr. 15, 2016, and titled "Quick Setup Of Lighting Control System," the entire content of which is incorporated herein by reference.

TECHNICAL FIELD

The present disclosure relates generally to lighting control, and more particularly to quick setup for provisioning and diagnostics of a lighting control system.

BACKGROUND

Buildings that are under construction or renovation need lighting installed and operational to illuminate work areas. Lighting fixtures are installed, verified and used for illuminating the work areas early in the construction/renovation process. The installation and verification of lighting fixtures and other lighting devices are performed by electricians that are skilled in the installation and wiring of electrical lighting devices. However, these electricians may not be generally trained with skills necessary to setup and provision lighting control systems and their networks. Further, after installation of lighting devices, these electricians may not be skilled to perform quick system diagnosis to detect and remedy light system problems. Thus, a solution that enables quick setup and diagnosis of lighting control systems and networks is desirable.

SUMMARY

The present disclosure relates generally to lighting control, and more particularly to quick setup for provisioning and diagnostics of a lighting control system. In an example embodiment, a lighting system includes a gateway device having a user input interface. The lighting system further includes a first lighting device configured to wirelessly communicate with the gateway device, and a second lighting device configured to wirelessly communicate with the gateway device. The gateway device is configured to initiate wireless communications with the first lighting device and the second lighting device in response to an input provided to the gateway device via the user input interface.

In another example embodiment, a method of provisioning a lighting system includes initiating, by a gateway device, wireless communications between the gateway device and lighting devices of the lighting system, where the gateway device includes a user input interface to receive a user input to initiate the wireless communications. The method further includes providing, by a lighting device of the lighting devices, a visual indication to indicate establishment of a first wireless communication between the gateway device and the lighting device of the lighting devices. The method also includes terminating, by the gateway device, attempts to establish the wireless communications between the gateway device and the lighting devices based on a timeout period or a second user input provided to the gateway device.

In another example embodiment, a method of performing a diagnostic evaluation of a lighting system includes receiving, by a gateway device, a user input to perform a diagnostic evaluation of wireless communications of the lighting system, where the gateway device includes a user input interface to receive the user input. The method further includes sending, by the gateway device, a wireless message to lighting devices of the lighting system in response to the user input to perform the diagnostic evaluation of the wireless communications of the lighting system. The method also includes providing, by a lighting device of the lighting devices, a visual indication to indicate existence of a wireless communication between the gateway device and the lighting device of the lighting devices.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
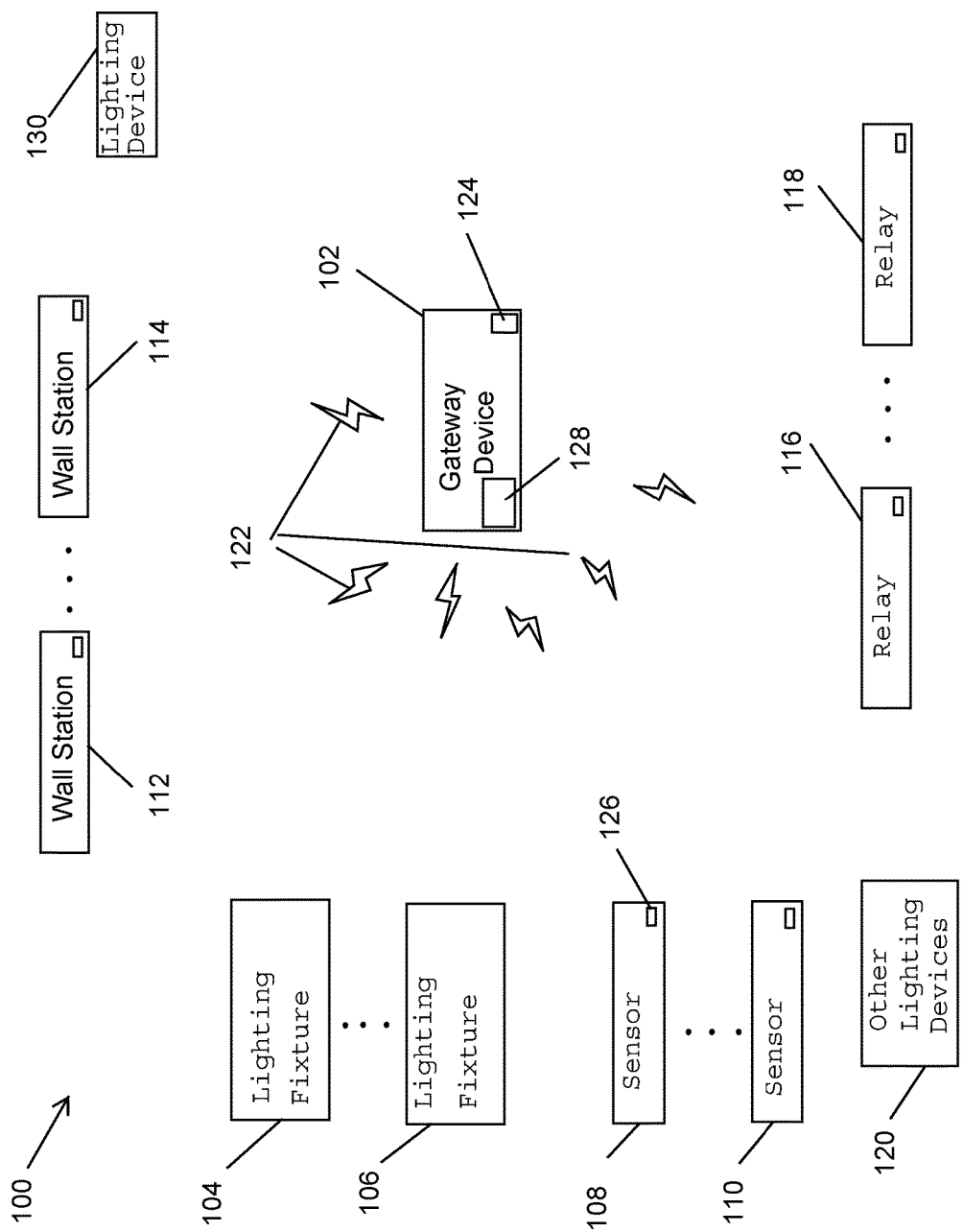
FIG. 1 illustrates a provisionable lighting system according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

Turning now to the figures, particular example embodiments are described. FIG. 1 illustrates a provisionable lighting system 100 according to an example embodiment. In some example embodiments, the lighting system 100 includes lighting devices including a gateway device 102, lighting fixtures 104, 106, sensors 108, 110, wall stations 112, 114, and relays 116, 118. The lighting system 100 may also include other lighting devices 120 (e.g., receptacles, etc.). The gateway device 102 and the lighting devices each include wireless communication circuitry to transmit and/or receive wireless signals. The lighting fixtures 104, 106 may each be a recessed lighting fixture, a high bay lighting fixture, etc. The sensors 108, 110 may each be a motion sensor, a daylight sensor, etc. The wall stations 112, 114 may be configured to control lighting provided by the lighting fixtures 104, 106 as well as other lighting fixtures of the system 100. The wall stations 112, 114 may also be configured to control other lighting devices of the lighting system 100 including the relays 116, 118.

The gateway device 102 includes a user input interface 124. The user input interface 124 is used for providing an input to the gateway device 102. For example, the user input interface 124 may be a push-button or another hardware and/or software interface as may be contemplated by those of ordinary skill in the art with the benefit of this disclosure. The gateway device 102 may also include a processor 128 for processing user input as well as performing other functions including controlling wireless communication of the gateway device 102.

In some example embodiments, the gateway device 102 communicates with the lighting devices via wireless signals 122. For example, the gateway device 102 as well as the lighting fixtures 104, 106, the sensors 108, 110, the wall stations 112, 114, and the relays 116, 118 may be compliant with IEEE 802.15.4 standard. In general, the wireless signals 122 can be processed by a device that is compliant with the IEEE 802.15.4 standard.

In some example embodiments, the gateway device 102 may be connected to an enterprise control device (not shown) via a wired or a separate wireless network for additional supervisory control capabilities. For example, a local or remote device (e.g., a laptop) may communicate wirelessly or via a wired connection, with the gateway device 102 to control operations of the lighting devices of the lighting system 100 that are in wireless communication with the gateway device 102.

After wireless communication is established between the gateway device 102 and the lighting devices (that is, the lighting fixtures 104, 106, the sensors 108, 110, the wall stations 112, 114, and the relays 116, 118, and the other lighting devices 120), the gateway device 102 may be used to control the operation of the lighting system 100. Wireless communications may be established between the gateway device 102 and one or more of the lighting devices (i.e., the gateway device 102 may be paired with one or more the lighting devices) in response to a user input provided to the gateway device 102.

To illustrate, to establish wireless communications between the gateway 102 and the lighting devices of the lighting system 100, a user may provide an input to the gateway device 102, for example, via the user input interface 124. In response to receiving the user input via the user input interface 124, the gateway device 102 may start transmitting a beacon signal via the wireless signals 122 to initiate the wireless communications between the gateway device 102 and the lighting devices including the lighting fixtures 102, 106, the sensors 108, 110, the wall stations 112, 114, and the relays 116, 118.

In some example embodiments, each of the lighting devices of the lighting system 100 is designed to provide a visual or other indication upon successfully pairing with the gateway device 102. For example, following the gateway device 102 transmitting the beacon signal to initiate wireless communications, some of the lighting devices may successfully pair with the gateway device 102, and other ones of the lighting devices may be unable to pair with the gateway device 102. The successfully paired lighting devices (i.e., the particular ones of the lighting devices that established wireless communications with the gateway device 102) may provide a visual or other indication of the successful pairing.

For example, the lighting fixture 104 may dim its light to indicate a successful establishment of a wireless communication between the gateway device 102 and the lighting fixture 104. As another example, the lighting fixture 106 may blink its light to indicate a successful establishment of a wireless communication between the gateway device 102 and the lighting fixture 106. As yet another example, the sensor 108 may blink a light emitted by a light emitting diode (LED) 126 to indicate a successful establishment of a wireless communication between the gateway device 102 and the sensor 108.

In some example embodiments, the lighting devices of the lighting system 100 may provide other visual indications of successful establishment of wireless communications with the gateway device 102 as may be contemplated by those of ordinary skill in the art with the benefit of this disclosure. For example, the lighting devices of the lighting system 100 may increase the intensity of the respective lights, flicker, fade, etc. In some alternative embodiments, the lighting devices may, instead of or in addition to the visual indications, provide other non-visual indications of successful establishment of wireless communications with the gateway device 102, such as audio and infrared based indications. For example, some of the lighting devices may provide visual as well as non-visual indications of successful pairing with the gateway device 102. Particular ones of the lighting devices that do not successfully pair with the gateway device 102 do not provide indications of successful establishment of wireless communications with the gateway device 102, allowing identification of lighting devices of the lighting system 100 that have not established communication with the gateway device 102 from the lighting devices of the lighting system 100 that have established communication with the gateway device 102.

In some example embodiments, the gateway device 102 may attempt to establish wireless communications with the lighting devices for a limited period of time (a gateway timeout period) after the user provides an input to the gateway device 102 to initiate establishment of the wireless communications between the gateway device 102 and the lighting devices of the lighting system 100. For example, the gateway device 102 may send a beacon signal to establish wireless communications for the gateway timeout period (e.g., 10 minutes). Alternatively, the gateway device 102 may send the beacon signal for more or less than 10 minutes without departing from the scope of this disclosure. For example, the gateway timeout period may be set based on the number and/or locations of the lighting devices in the lighting system 100.

In some example embodiments, a user may also provide an input to the gateway device 102 to terminate attempts to establish wireless communications with the lighting devices of the lighting system 100. For example, a user may provide the input to the gateway device 102 via the user input interface 124. Upon receiving such an input, attempts by the gateway device 102 to establish wireless communications with the lighting devices of the lighting system 100 may be terminated without terminating wireless communications already established between the gateway 102 and some of the lighting devices of the lighting system 100.

As a non-limiting example, if wireless communication is established between the gateway device 102 and the lighting fixture 104 and no wireless communication is established between the gateway device 102 and the other lighting devices of the lighting system 100, the gateway device 102 may terminate attempts to establish wireless communications with the other lighting devices in response to a user input provided to the gateway device 102 and may continue to communicate with the lighting fixture 104.

In some example embodiments, upon the availability of power to the lighting devices the lighting system 100, the lighting devices may attempt to establish wireless communications with the gateway device 102. Each of the lighting devices may attempt to pair with the gateway device 102 for a limited period of time (a lighting device timeout period) following the availability of power to the particular lighting device. For example, the lighting devices may look for the beacon signal (i.e., network join beacon signal) from the gateway device 102 for a 2-minute lighting device timeout period after the lighting devices are powered on.

To illustrate, electrical power to the lighting devices of the lighting system 100 may be controlled by a mains circuit breaker. When the power to the lighting devices is turned on at the circuit breaker, the lighting devices may automatically start attempting to establish wireless communications with the gateway device 102. That is, a user input to the lighting devices is not required to initiate attempts by the lighting devices to establish wireless communications with the gateway device 102. For example, upon powering up of the lighting devices, each lighting device (i.e., the lighting fixture 104, 106, the sensor 108, 110, etc.) may start searching for a network join beacon signal transmitted by the gateway device 102 and continue to do so for a lighting device timeout period or until the wireless communication is established. The lighting devices may pair (i.e., establish wireless communication) with the gateway device 102 if the gateway device 102 is also attempting to establish wireless communications with the lighting devices, for example, by sending the network join beacon signal. In some example embodiments, the lighting devices may be powered on before the wireless communications between the gateway device and the lighting devices is initiated by providing a user input to the gateway device 102.

At power up, the lighting devices may have a default state. That is, the lighting devices may operate according to default settings. For example, the lighting fixtures 104, 106 may emit light at less than full brightness level or at 75 percent of full brightness level. As another example, the LED 126 of the sensor 108, 110 may emit a steady light or a particular color light, and relays and receptacles of the lighting system 100 may be on. The particular lighting devices that successful pair with the gateway device 102 following power up may change the characteristics of the respective emitted light to provide a visual indication of the successful pairing or may provide another indication of the successful pairing.

In some example embodiments, a lighting device may be added to the system 100 after the lighting system 100 has been operational, where at least some of the lighting devices of the lighting system 100 have already established wireless communication with the gateway device 102. For example, a lighting device 130 may be added and powered on after the lighting fixtures 104, 106 have already established wireless communications with the gateway device 102. The gateway device 102 may attempt to establish wireless communication with the newly added lighting device in response to a user input to the gateway device 102. For example, the user input to the gateway device 102 to establish wireless communication may be provided via the input interface 124.

In some example embodiments, diagnostics of the lighting system 100 may be performed after the lighting system 100 has been operational for some time. For example, at least some of the lighting devices of the lighting system 100 may be in wireless communication with the gateway device 102 and may be controlled through the gateway device 102. To illustrate, the wall station 112 may control the lighting fixture 104 by communicating through the gateway device 102. However, some of the lighting devices of the lighting system 100 may not be in wireless communication with the gateway device 102. For example, some of the lighting devices that previously established wireless communication with the gateway device 102 may have become disconnected, and some others may have never established wireless communication with the gateway device 102.

To more efficiently determine which of the lighting devices are in wireless communication with the gateway device 102 and which lighting devices are not, a user may perform diagnostics of the lighting system 100 by providing a user input to the gateway device 102. For example, in response to the user input provided via the interface 124, the gateway device 102 may wirelessly send a message to the lighting devices to provide a visual or other indication that the lighting devices are in wireless communication (i.e., paired) with the gateway device 102. The particular ones of the lighting devices that are in established wireless communication with the gateway device 102 may provide visual or other indications, for example, similar to the indications that the lighting devices provide at the establishment of the wireless communications with the gateway device 102. The lighting devices that do not provide the visual or other indication in response to the message from the gateway device 102 may be checked for defects and/or other issues and repaired or replaced if necessary. The gateway device 102 may also wirelessly send a message to the lighting devices of the lighting system 100 to terminate the visual indication in response to the gateway device 102 receiving a second user input that indicates to the gateway device 102 to send the termination message. For example, a technician may provide the second input to the gateway device 102 after identifying the particular lighting devices of the lighting system 100 that are not in wireless communications with the gateway device 102 based on the lack of visual or other indications from the particular lighting devices. By performing diagnostics of the lighting devices in such a manner, the required skill may be less compared to the skill level needed to perform individual diagnostic evaluations of the lighting devices.

In some example embodiments, the gateway device 102 categorizes the lighting devices of the lighting system 100 into groups, where the lighting devices that are of the same type are grouped together. To illustrate, the gateway device 102 may combine information from lighting devices categorized into a group such that information from one of the lighting devices in the group is considered as corresponding to the group or information from all of the lighting devices in the group is considered to take action with respect to the group. For example, information from the lighting fixtures 104, 106 and other lighting fixtures of the system 100 may be combined together, and the status indicators from the lighting fixtures 104, 106 may be considered as a group, for example, to take an action that depends on the status of the entire group. Alternatively, information from anyone of the lighting fixtures may be used to take action with respect to the group of lighting fixtures.

In some example embodiments, status indicators from the sensors 108, 110, etc. may be combined, for example, to take actions that depend on the status of all sensors or just one of the sensors 108, 110. For example, lighting fixtures of the lighting system 100 may be turned on if a motion is detected by the sensor 108 even if the motion is not detected by the sensor 110. The gateway device 102 may combine information from relays 116, 118, and the gateway device 102 may combine information from the wall stations 112, 114. By automatically grouping together lighting devices that are of the same type, the gateway device 102 reduces the skill level required by a user to perform provisioning of the system 100.

Based on visual or other indications provided by the lighting devices to indicate establishment of wireless communications between the individual lighting devices and the gateway device 102, a user (e.g., an electrician), by providing an input to the gateway device 102 to initiate the wireless communications, can perform a quick setup of the wireless communications of the system 100 and also quickly identify particular lighting devices that fail to establish wireless communications with the gateway device 102. Further, based on visual or other indications provided by the individual lighting devices to indicate that wireless communications exist between the individual lighting devices and the gateway device 102, a user (e.g., an electrician), by providing a diagnostics input to the gateway device 102, can perform quick diagnostic evaluation of wireless communications of the system 100 and quickly identify particular lighting devices that are not in wireless communication with the gateway device 102. Because a user input to initiate wireless communications is not required at each lighting fixture 102, 106, sensor 108, 110, relays 116, 118, etc., the process of establishing the wireless communications and diagnosing problems with the wireless communications can be performed quickly.

In some alternative embodiments, the lighting system 100 may include fewer or more lighting devices than shown in FIG. 1. In some alternative embodiments, the communication between the gateway device 102 and some of the lighting devices of the lighting system 100 may be wired instead of wireless. In some example embodiments, lighting devices other than those shown in FIG. 1 may be included in the system 100 without departing from the scope of this disclosure.

Figure 2:
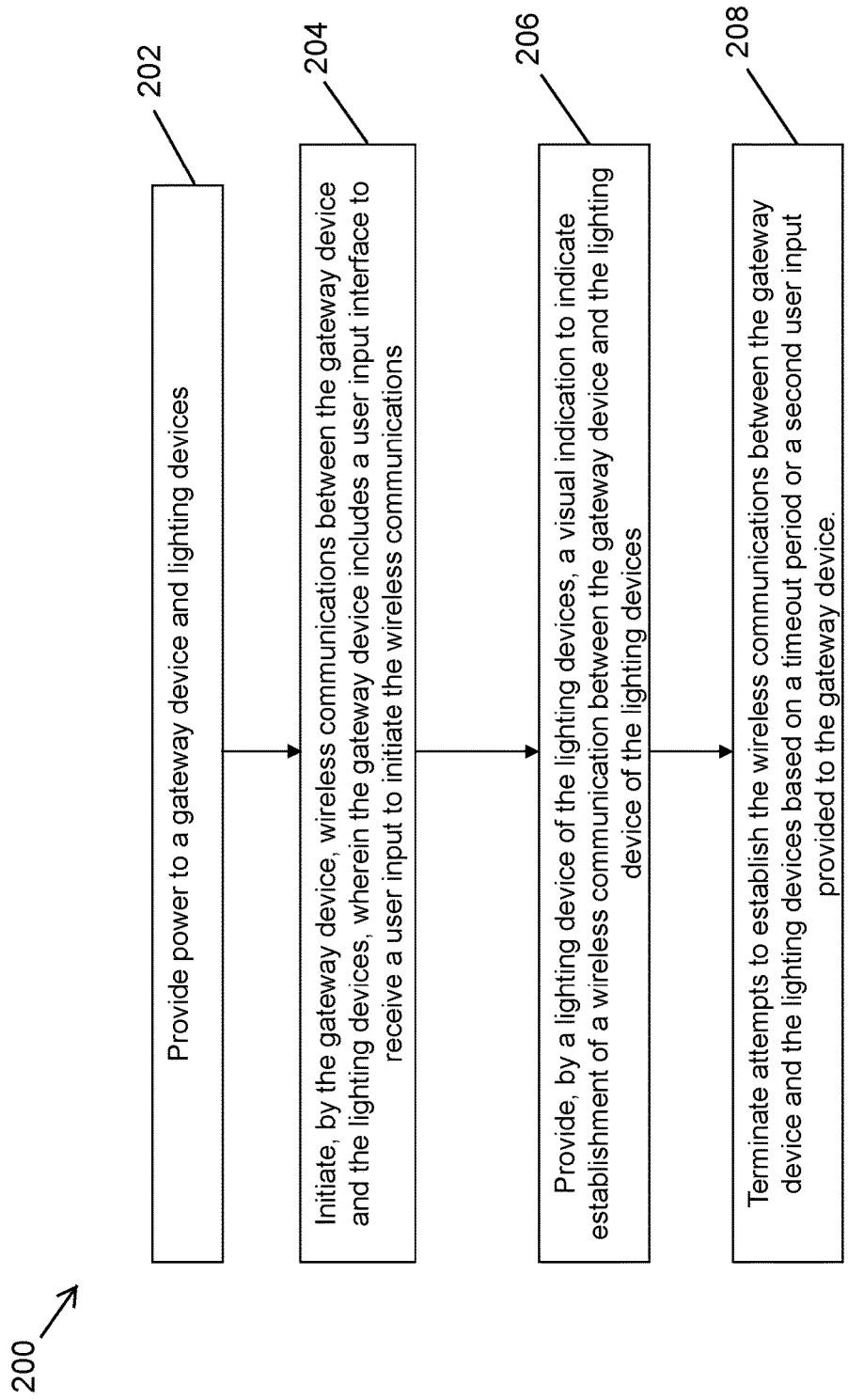
FIG. 2 illustrates a method of quick setup of a lighting control system according to an example embodiment.

FIG. 2 illustrates a method 200 of quick setup of a lighting control system according to an example embodiment. Referring to FIGS. 1 and 2, the method 200 includes at step 202 providing power to a gateway and to lighting devices. For example, electrical power may be provided to the gateway device 102 and to the lighting devices (i.e., the lighting fixtures 104, 106, the sensors 108, 110, etc.) by switching on the power at a circuit breaker.

At step 204, the method 200 continues with initiating, by the gateway device, wireless communications between the gateway device and lighting devices. The gateway device may include a user input interface to receive a user input to initiate the wireless communications. For example, the gateway device 102 may initiate wireless communications with the lighting devices of the lighting system 100. To illustrate, the gateway device 102 may include the user input interface 124 that may be, for example, a push-button, and the user may press the push-button for a short duration (e.g., tap the push-button) to indicate to the gateway device 102 to initiate the wireless communications with the lighting devices of the lighting system 100.

At step 206, the method 200 includes providing, by a lighting device of the lighting devices, a visual or other indication to indicate establishment of a wireless communication between the gateway device and the lighting device. For example, the lighting fixture 104 may dim the light emitted by the lighting fixture 104 to 10 percent of full brightness to indicate that the lighting fixture 104 is paired with the gateway device 102. The other lighting devices may also provide visual or indications of successful pairing with the gateway device 102 as described above. For example, to indicate successful pairing with the gateway device 102, each of the relays 116, 118 may flash its respective light, and each wall station 112, 114 may blink a respective LED.

In some example embodiments, the gateway device 102 may instruct the lighting devices to stop providing the visual and/or other indications of successful pairing with the gateway device 102 in response to another user input provided to the gateway device 102. For example, a user may provide an input to the gateway device 102 via the input interface 124 of the gateway device 102, the gateway device 102 may instruct the lighting devices to stop providing the visual and other indications.

At step 208, the method 200 includes terminating, by the gateway device, attempts to establish the wireless communications between the gateway device and the lighting devices based on a timeout period or a second user input provided to the gateway device. In some example embodiments, the lighting devices may start searching for a network join beacon signal transmitted by the gateway device 102 upon power being provided to the lighting devices. The lighting devices may not require additional a user input to start searching for the join beacon signal or to otherwise establish the wireless communications with the gateway device 102. In some example embodiments, each lighting device of the lighting system 100 may terminate attempts to establish the wireless communication between the gateway device and the lighting device after a timeout period. For each lighting device, the timeout period may start from the time that power is provided to the lighting device or from the time that the lighting device starts attempting to establish the wireless communication with the gateway device 102.

Figure 3:
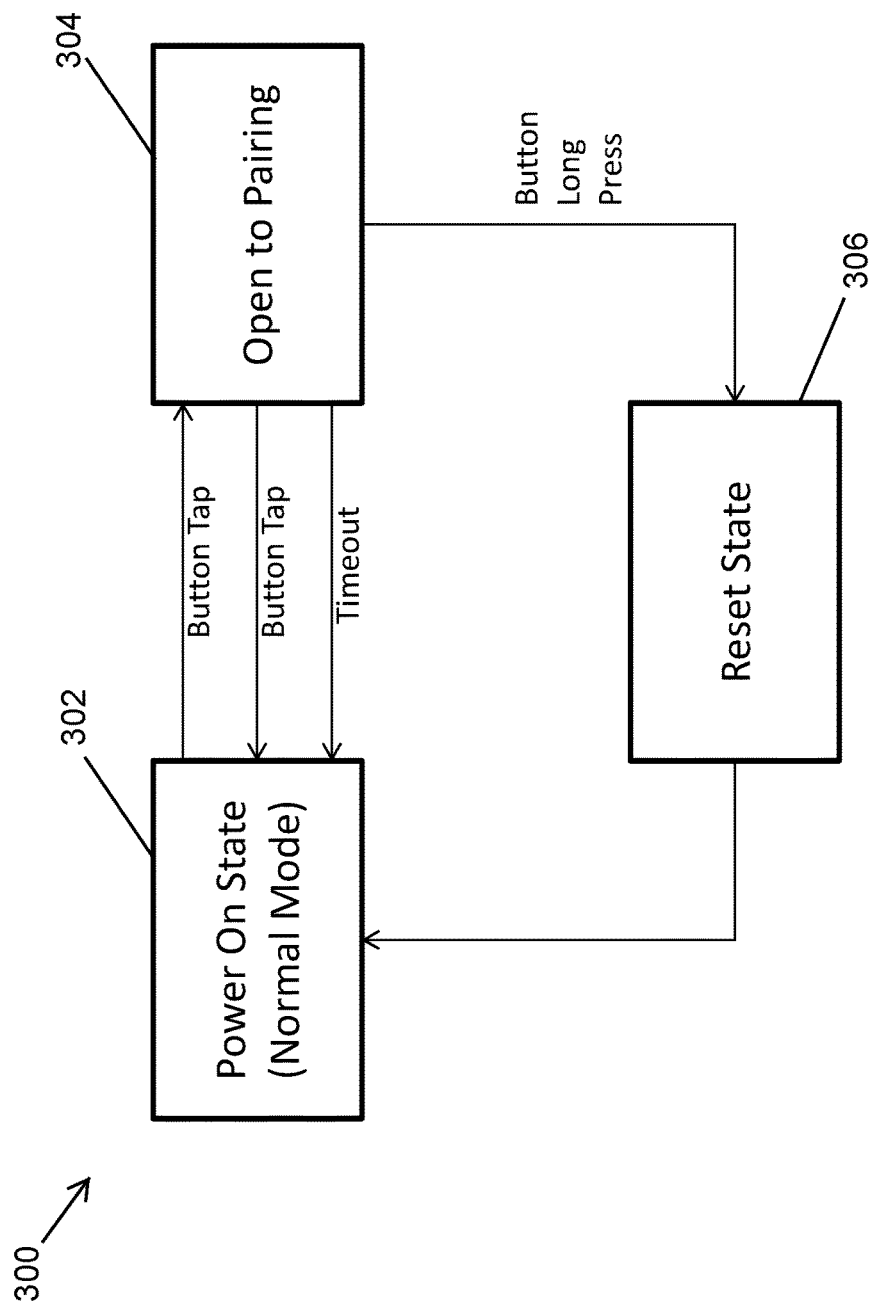
FIG. 3 illustrates different operational states of the gateway device of FIG. 1 according to an example embodiment.

FIG. 3 illustrates different operational states of the gateway device 102 of FIG. 1 according to an example embodiment. Referring to FIGS. 1 and 3, in state 302, the gateway device 102 is in a normal operational state after having been powered on. In the state 302, the gateway device 102 may have already established wireless communications with some lighting devices such as the lighting fixtures 104, 106. The gateway device 102 may be actively controlling the lighting devices that are in wireless communication with the gateway device 102. In the state 302, the wall station 112 may control the lighting fixtures 104, 106 through the gateway device 102.

In embodiments of the gateway device 102 where the input interface 124 is a button, a tap (or short press) of the button of the gateway device 102 causes the gateway device 102 to transition to a state 304. The state 304 is an open-to-pairing state of the gateway device 102 during which the gateway device 102 attempts to establish wireless communications with the lighting devices of the lighting system 100.

The lighting devices that successfully pair with the gateway device 102 may provide a visual or other indication of successful pairing with the gateway device 102. For example, the lighting fixtures of the lighting system 100 may dim respective lights to, for example, 10% of full brightness, relays of the lighting system 100 may flash respective lights, etc. While the gateway device 102 is in the state 304, a tap (short press) on the input interface button of the gateway device 102 may return the gateway device 102 to the state 302, where the gateway device 102 continues to operate in the state 302 described above.

In some example embodiments, the gateway device 102 may also return to the state 302 after a timeout period of the gateway device 102. For example, after attempting to establish wireless communications with the lighting devices of the lighting system 100, the gateway device 102 may return to the state 302 regardless of whether one or more of the lighting devices have successfully paired with the gateway device 102. During the timeout period of the gateway device 102, some of the lighting devices of the lighting system 100 may have successfully established wireless communications with the gateway device 102 while other lighting devices of the lighting system 100 did not succeed in doing so. After returning to the state 302, the gateway device 102 may be able to control the lighting devices that were able to successfully pair with the gateway device 102. For example, at a later time, the gateway device 102 may instruct the gateway device 102 to provide a visual or other indication of being in wireless communication with the gateway device 102 for diagnostics purposes.

In some example embodiments, while the gateway device 102 is in the state 304, a relatively longer button press on the input interface button of the gateway device 102 may place the gateway device 102 in a reset state 306. In the reset state 306, the gateway device 102 may terminate wireless communications with lighting devices of the lighting system 100. For example, the gateway device 102 may instruct the lighting devices to leave the wireless network. The gateway device 102 may also remove configurations/settings of the lighting devices previously provided to the lighting devices.

Although the user input interface 124 of the gateway device 102 is described above as a button, in alternative embodiments, the user input interface 124 may be another type of interface including a slider switch, a dip switch, a touch screen, etc. without departing from the scope of this disclosure. Further, although the transitions of the gateway device 102 between the different states 302, 304, 306, is described above with respect to taps and presses of the button, in alternative embodiments, the inputs to the gateway device 102 may be provided based on sequences of taps, presses, presses of the button with respect to different time periods, etc.

Figure 4:
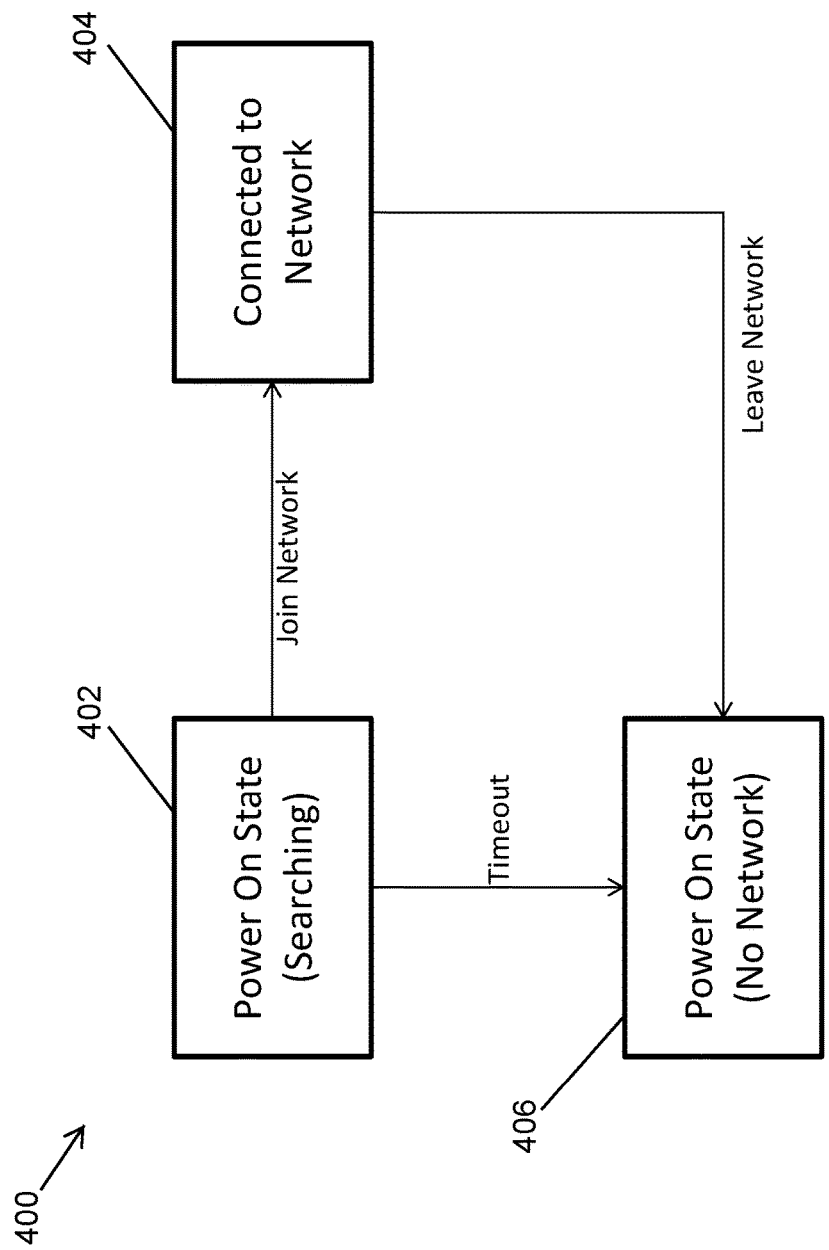
FIG. 4 illustrates different operational states of the lighting devices of FIG. 1 according to an example embodiment.

FIG. 4 illustrates different operational states of the lighting devices of FIG. 1 according to an example embodiment. Referring to FIGS. 1 and 4, in state 402, the lighting devices are in a power-on state after having been powered on, for example, by switching on a circuit breaker that control power to the lighting devices. For example, the lighting fixtures 104, 106, the sensors 108, 110, the wall stations 112, 114, the relays 116, 118, and the other lighting devices 120 may each be in the power-on state 402. In the state 402, the lighting fixtures 104, 106 may be at less than full brightness or at full brightness. For example, the lights emitted by the lighting fixtures 104, 106 may be at 75% of full brightness. In the state 402, relays 116, 118 and some other lighting devices such as receptacles may be on, and sensors 108, 110 may be under local control.

In some example embodiments, in the state 402, each one of the lighting devices of the lighting system 100 may attempt to establish wireless communications with the gateway device 102 for a lighting device timeout period (e.g., 2 minutes). Particular lighting devices of the lighting system 100 that do not successfully pair with the gateway device 102 prior to the expiration of the timeout period may enter a state 406, where these lighting devices are no longer attempting to pair with the gateway device 102. In some example embodiments, relays and receptacles that are in the state 406 may remain on, and lighting fixtures that are in the state 406 may emit lights at the same dim level as in the state 402 the lighting fixtures in the state 402.

The particular lighting devices of the lighting system 100 that successfully pair with the gateway device 102 enter a state 404, where the lighting devices communicate with the gateway device 102. For example, in the state 404, the sensors 108, 118 may report to the gateway device 102 status information. In the state 404, the wall stations 112, 114 may also report to the gateway device 102. The gateway device 102 may control output lighting devices, such as the lighting fixtures 104, 106, that are in the state 404.

In some example embodiments, the lighting devices of the lighting system 100 that are in the state 404 may leave the wireless network and enter the state 406 upon instructions from the gateway device 102 to terminate the wireless communications with the gateway device 102. The lighting devices that enter the state 404 from the state 404 may start operating based on parameters (e.g., dim level, etc.) applicable to the state 404.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A lighting system, comprising:
a gateway device having a physically integrated user input interface;
a first lighting device configured to wirelessly communicate with the gateway device;
a second lighting device configured to wirelessly communicate with the gateway device; and
lighting control devices configured to wirelessly communicate with the gateway device, wherein the gateway device is configured to initiate wireless communications with multiple lighting devices including the first lighting device, the second lighting device, and the lighting control devices by transmitting a network join beacon signal to the multiple lighting devices in response to a user input physically provided to the gateway device via the physically integrated user input interface, wherein the multiple lighting devices are configured to search for the network join beacon signal for a timeout period upon being powered up, wherein the first lighting device provides a visual indication to indicate that a wireless communication is established between the first lighting device and the gateway device, wherein the gateway device is configured to combine, upon the wireless communications being established between the gateway device and the multiple lighting devices, lighting control information received by the gateway device from two or more lighting control devices of the lighting control devices to generate combined lighting control information that is transmitted to control the first lighting device and the second lighting device.

2. The system of claim 1, wherein the first lighting device is a lighting fixture and wherein the visual indication is dimming of a light emitted by the lighting fixture.

3. The system of claim 1, wherein the first lighting device is a relay and wherein the visual indication is flashing of a light emitted by a light source of the relay.

4. The system of claim 1, wherein the first lighting device and the second lighting device are each a lighting fixture, a relay, or a receptacle.

5. The system of claim 1, wherein the lighting control devices include a first sensor and a second sensor, wherein the lighting control information received by the gateway device includes first status information from the first sensor and second status information from the second sensor.

6. The system of claim 5, wherein the lighting control devices include two or more wall stations and wherein the lighting control information received by the gateway device includes information from the two or more wall stations.

7. The system of claim 1, wherein the gateway device is configured to terminate attempts to establish the wireless communications with the first lighting device and the second lighting device in response to a second input provided to the gateway device via the physically integrated user input interface.

8. The system of claim 1, wherein the gateway device is configured to terminate attempts to establish the wireless communications with the first lighting device and the second lighting device after a timeout period.

9. The system of claim 1, wherein the gateway device is configured to terminate wireless communications established between the gateway device and the first lighting device and between the gateway device and the second lighting device in response to a second input provided to the gateway device via the physically integrated user input interface.

10. The system of claim 1, wherein the physically integrated user input interface is a push-button.

11. A method of provisioning a lighting system, the method comprising:
    initiating, by a gateway device, wireless communications between the gateway device and multiple lighting devices of the lighting system by transmitting a network join beacon signal in response to a first user input physically provided to the gateway device via a physically integrated user input interface of the gateway device to initiate the wireless communications, wherein the multiple lighting devices include a lighting device and lighting control devices;
    providing, by the lighting device, a visual indication to indicate an establishment of a first wireless communication between the gateway device and the lighting device, wherein the gateway device is configured to combine, upon the wireless communications being established between the gateway device and the multiple lighting devices, lighting control information received by the gateway device from two or more lighting control devices of the lighting control devices to generate combined lighting control information that is transmitted to control the lighting device; and
    terminating, by the gateway device, attempts to establish the wireless communications between the gateway device and the multiple lighting devices based on a timeout period or a second user input physically provided to the gateway device via the physically integrated user input interface of the gateway device.

12. The method of claim 11, wherein the multiple lighting devices are powered on before the wireless communications between the gateway device and the multiple lighting devices are initiated by the gateway device, wherein the first wireless communication between the gateway device and the lighting device is established without a user providing a lighting device input to the lighting device to establish the first wireless communication with the gateway device.

13. The method of claim 11, further comprising initiating, by the gateway device, a second wireless communication between the gateway device and a second lighting device, wherein the second lighting device is powered on after the first wireless communication between the gateway device and the lighting device is established.

14. The method of claim 13, wherein the second wireless communication between the gateway device and the second lighting device is established without a user providing a lighting device input to the second lighting device to establish the second wireless communication between the gateway device and the second lighting device.

15. The method of claim 11, further comprising terminating, by the gateway device, the first wireless communication between the gateway device and the lighting device of the multiple lighting devices in response to the gateway device receiving a third user input to terminate the wireless communications.

16. The method of claim 11, further comprising sending, by the gateway device, a message wirelessly to the lighting device to terminate the visual indication, wherein the gateway device sends the message in response to the gateway device receiving a third user input.

17. The method of claim 11, wherein the lighting control devices include sensors.

18. A method of performing a diagnostic evaluation of a lighting system, the method comprising:
    initiating, by a gateway device, wireless communications between the gateway device and multiple lighting devices of the lighting system by transmitting a network join beacon signal in response to a first user input physically provided to the gateway device via a physically integrated user input interface of the gateway device to initiate the wireless communications, wherein the multiple lighting devices include a lighting device and lighting control devices;
    providing, by the lighting device, a visual indication indicating an establishment of a wireless communication between the gateway device and the lighting device, wherein the gateway device is configured to combine, upon the wireless communications being established between the gateway device and the multiple lighting devices, lighting control information received by the gateway device from two or more lighting control devices of the lighting control devices to generate combined lighting control information that is transmitted to control the lighting device;
    receiving, by the gateway device, a second user input to perform the diagnostic evaluation of the wireless communications, wherein the second user input is physically provided to the gateway device via the physically integrated user input interface;
    sending, by the gateway device, a wireless message to the multiple lighting devices in response to the second user input, wherein the wireless message includes an instruction to provide a visual status indication; and
    providing, by the first lighting device, the visual status indication indicating an existence of a wireless communication between the gateway device and the first lighting device.

19. The method of claim 18, wherein the lighting device is a lighting fixture and wherein the visual indication is dimming of a light emitted by the lighting fixture.

20. The method of claim 18, further comprising wirelessly sending, by the gateway device, a message to the lighting device to terminate the visual status indication, wherein the gateway device sends the message in response to the gateway device receiving a second user input.

* * * * *